United States Patent [19]

Latour-Henner et al.

[11] Patent Number: 5,608,756
[45] Date of Patent: Mar. 4, 1997

[54] DEVICE FOR IDENTIFYING TRAFFIC ON A PAIRED CABLE

[75] Inventors: Alexander Latour-Henner; Bjorn Isheden, both of Farsta, Sweden

[73] Assignee: Televerket, Farsta, Sweden

[21] Appl. No.: 395,660

[22] Filed: Feb. 28, 1995

Related U.S. Application Data

[63] Continuation of Ser. No. 768,848, filed as PCT/SE90/00081 Feb. 8, 1990 published as WO91/12535 Aug. 22, 1991, abandoned.

[51] Int. Cl.$^6$ .............................. G01R 23/16; H04M 3/22
[52] U.S. Cl. ................... 375/228; 375/224; 375/257; 330/135; 330/306; 333/17.2
[58] Field of Search ..................... 375/228, 257, 375/270, 288, 301, 317, 321, 224; 333/17.2; 330/126, 135, 306; 327/309, 311; 370/72, 120, 123; 345/39, 117

[56] References Cited

U.S. PATENT DOCUMENTS

| | | | |
|---|---|---|---|
| 3,428,899 | 2/1969 | Sekimoto | 370/123 |
| 3,961,172 | 6/1976 | Hutcheon | 327/309 |
| 4,103,243 | 7/1978 | Orban | 330/126 |
| 4,368,435 | 1/1983 | Bloy | 330/126 |
| 4,377,006 | 3/1983 | Collins et al. | 375/340 X |
| 4,577,155 | 3/1986 | Kabayashi et al. | 375/318 X |
| 4,620,147 | 10/1986 | Niki | 455/243.1 |
| 4,775,984 | 10/1988 | Jaffre et al. | 375/257 X |
| 4,777,331 | 10/1988 | Borst | 375/257 X |
| 4,777,645 | 10/1988 | Faith et al. | 375/224 X |
| 5,172,395 | 12/1992 | Dapper et al. | 375/227 X |

*Primary Examiner*—Young T. Tse
*Attorney, Agent, or Firm*—Oblon, Spivak, McClelland, Maier & Neustadt, P.C.

[57] ABSTRACT

The invention relates to a device identifying traffic on a cable. The different types of traffic are characterized by different levels and frequency ranges. The device includes a limiter connected to the paired cable and delivering an output signal having substantially constant amplitude And a frequency corresponding to the strongest frequency component of the input signal. The limiter may be constructed of inverters coupled as an amplifier or of an amplifier having a Schmitt trigger. The limiter is connected to a frequency indicator indicating what frequency ranges within which the strongest frequency component lies. The frequency indicator may consist of monostables or counters and decoders. The decoder interprets the output signal of the counter and may be constructed of a fixed gate network or of a programmable memory. The output signal of the frequency indicator is connected to an indicator indicating the frequency range in question, e.g. by means of flashing light-emitting diodes.

10 Claims, 3 Drawing Sheets

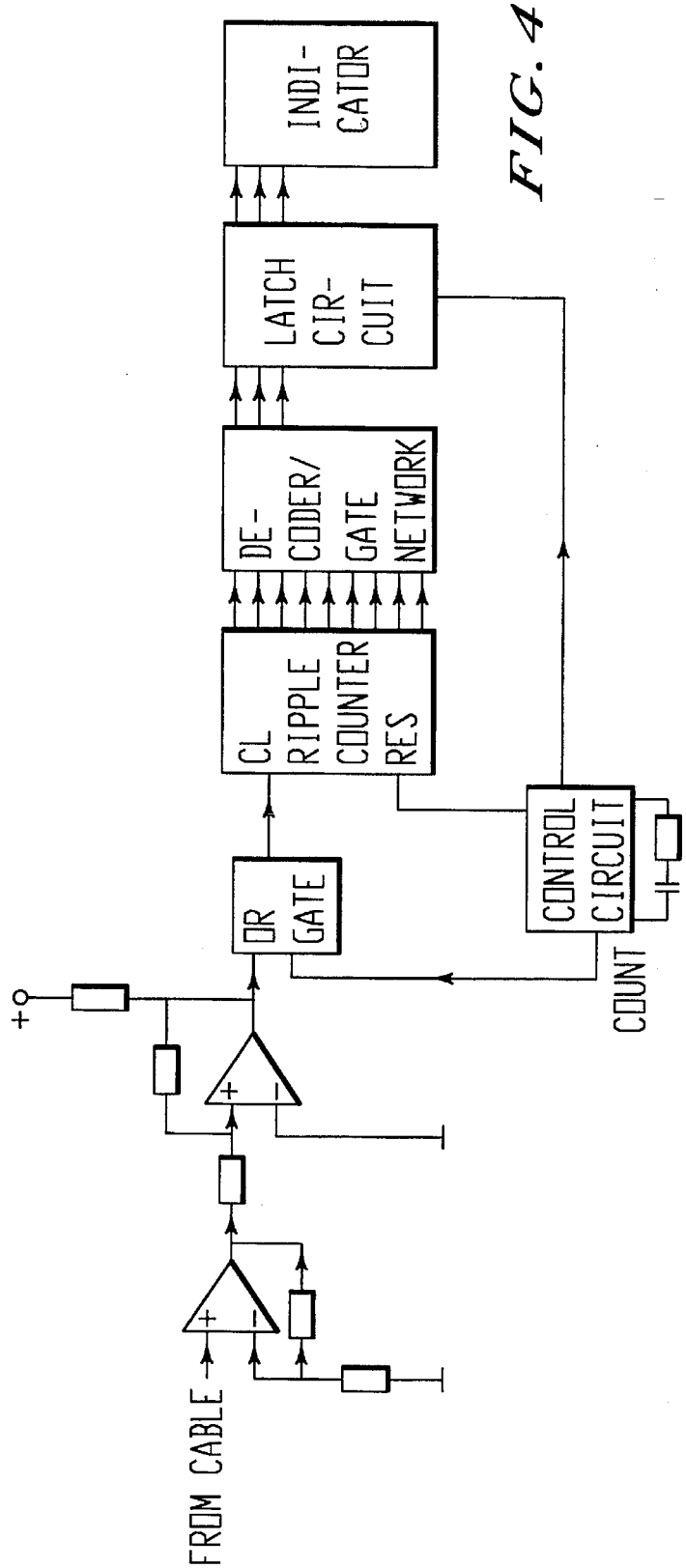
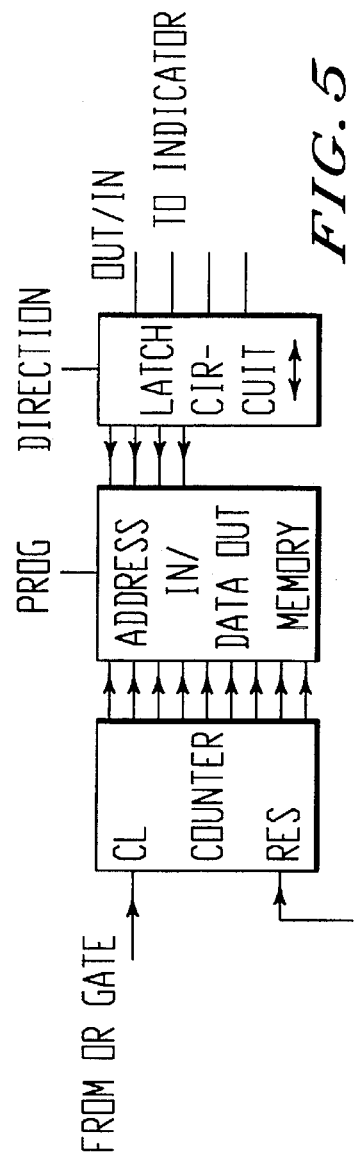

DEVICE FOR IDENTIFYING TRAFFIC ON A PAIRED CABLE

This application is a continuation of application Ser. No. 07/768,848, filed on Nov. 6, 1991, now abandoned which was filed as PCT application PCT/SE90/00081 on Feb. 8, 1990.

BACKGROUND OF THE INVENTION

1. Field of the Invention

The invention relates to a device for identification of telecommunication traffic occupying a pair in a paired cable. The identification encompasses all types of traffic on said type of cable existing at present and planned in the future. Identification of the cable is required inter alia in order to identify the cable itself and in order to avoid disconnection of important connections, e.g. data and alarm connections. The various types of traffic can be identified because of their different frequency ranges and levels.

2. State of the Art

A number of devices for identifying traffic are known. Common to these devices is that electrical filter are used to separate the desired information from the signal. However, electrical filters are expensive and the devices have a complicated structure.

SUMMARY OF THE INVENTION

The present invention provides a device for identifying traffic, which device has a simple structure and is made of cheap and reliable components. The features of the invention are a broadband limiter connected to the paired cable and delivering an output signal having essentially constant amplitude and a frequency corresponding to the strongest frequency component of the input signal, and a frequency indicator indicating the frequency range of said frequency component.

The limiter comprises either an amplifier constructed of series-connected inverters or of an amplifier constructed of an operational amplifier and a Schmitt trigger.

The frequency indicator comprises either a fixed gate network or a programmable memory. The indication is executed e.g. by flashing light-emitting diodes.

BRIEF DESCRIPTION OF THE DRAWINGS

The invention now will be described with reference to the appended drawings, in which

FIG. 4 is a simplified circuit diagram of a second embodiment of the present invention; and FIG. 5 is a diagram of a software decoder in accordance with the present invention.

DESCRIPTION OF THE PREFERRED EMBODIMENTS

The object of the invention is to be able to work without interfering in the line network. This presupposes that you have a knowledge about types of traffic existing on the different cables of the network. The purpose of the device of the invention is to indicate what type of traffic is occupying a connection.

Figure 1:
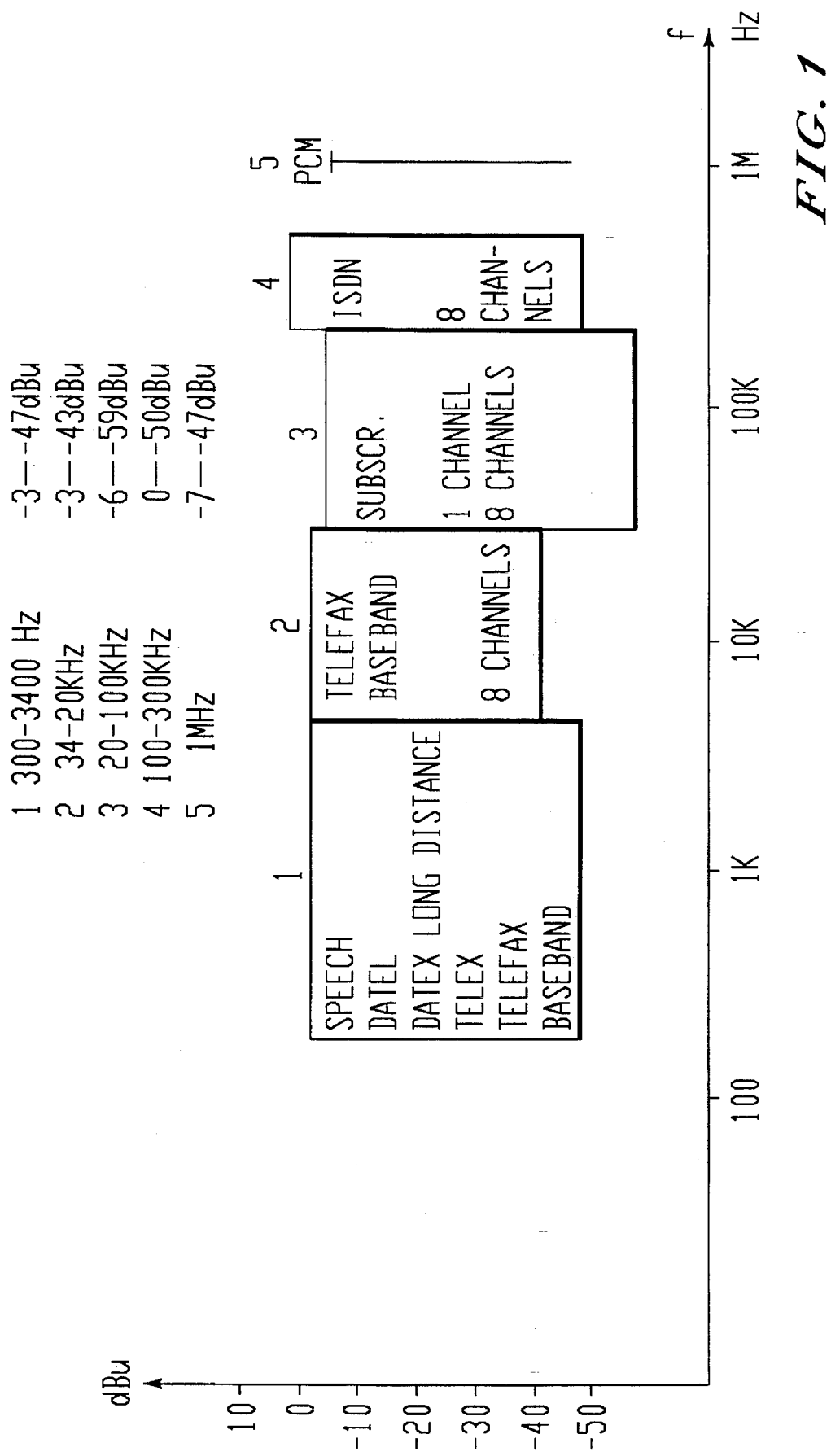
FIG. 1 is a diagram showing frequency and level of different types of traffic.

FIG. 1 shows a diagram of the frequencies and levels of existing and planned types of traffic. Thus, the different types of traffic encompasses a large range of levels and frequencies.

Figure 2:
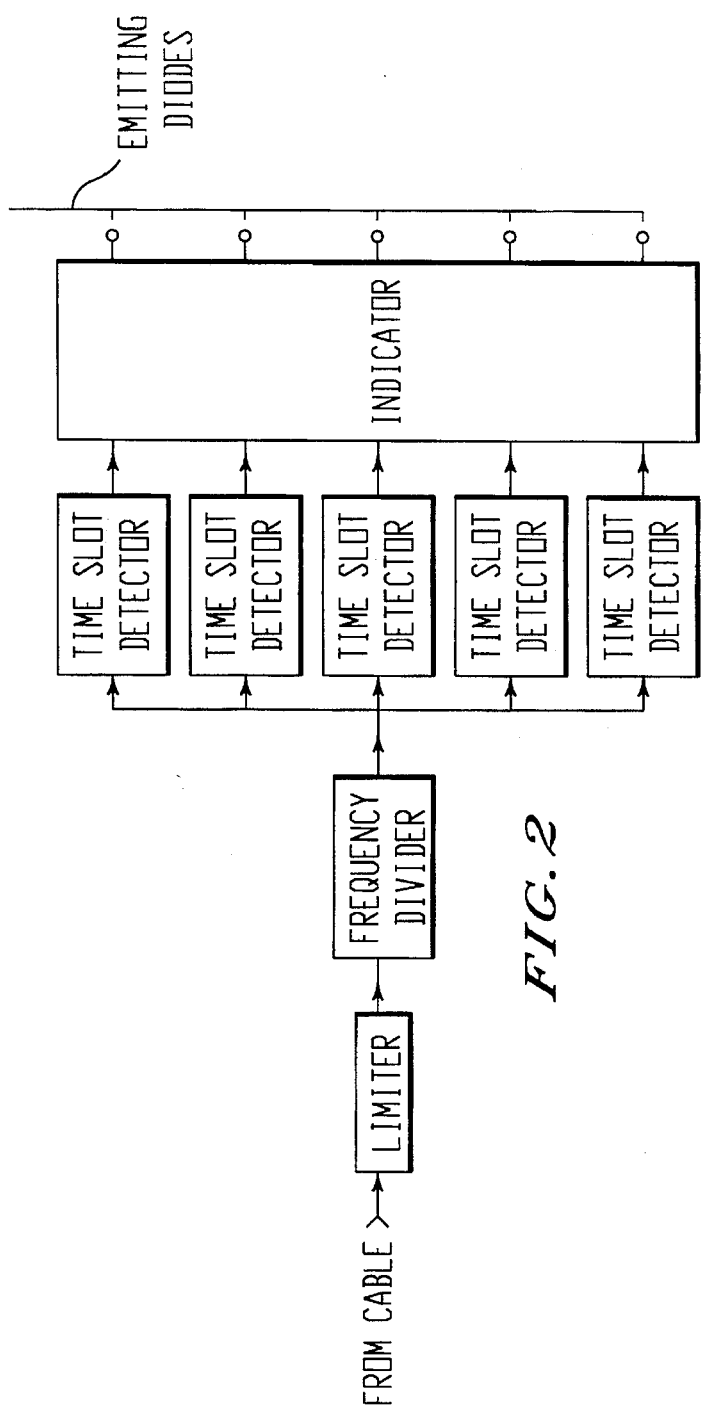
FIG. 2 is a block diagram of the invention.

FIG. 2 shows a block diagram of the device in accordance with the present invention. The device essentially consists of three function blocks: a broadband limiter having a high impedance input, a time slot detector and an indicator. The combined signal occupying the line in question is delivered to the broadband limiter that because of its non-linear function amplifies the strongest frequency component of the signal while suppressing the weak components. Thereby, the output signal of the limiter gets a constant amplitude and a frequency corresponding to the strongest frequency component of the input signal.

The output signal of the limiter is delivered to the time slot detector, possibly after frequency division in a frequency divider. The time slot detector classifies its input signal on the basis of periodic time and, thus, is a kind of frequency meter. The purpose of the frequency divider is to divide the frequency N times and to average the possible varying frequency of the signal of the limiter. Therefore, the output signal of the frequency divider has a periodic time equal to N times the average of the N latest periods of the output signal of the limiter. The classification performed by the time slot detector generates data which by decoding and indication by the indicator informs the operator about the frequency band in which the input signal of the limiter has its strongest frequency component.

Since the distribution of the frequencies of the different types of traffic is known, it is possible to infer, in addition to learn that traffic occupies the line, what type of traffic it is.

Figure 3:
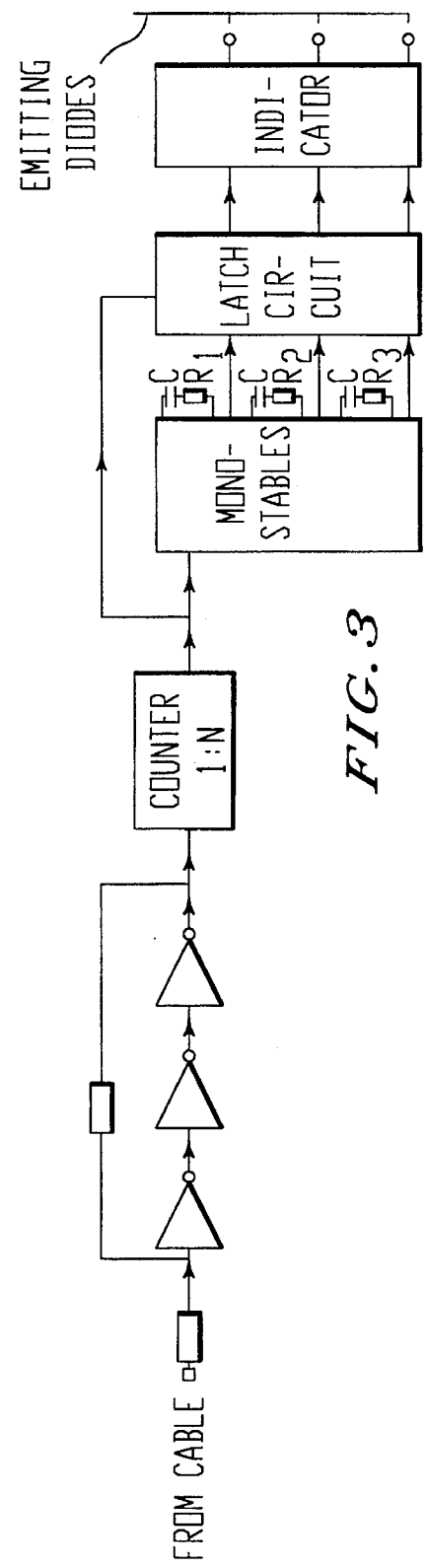
FIG. 3 is a simplified circuit diagram of a first embodiment of the invention.

FIG. 3 shows a first embodiment of the invention. Here, the limiter is constructed of three inverters connected by two resistors to form an inverting amplifier. The amplifier has a high amplification and high input impedance. The frequency divider is a counter having N e.g equal to 256. The time slot detector is a circuit having a number of monostables having different time constants CR1, CR2, etc. The outputs of the monostables are connected via a latch circuit to an indicator.

The limiter has a non-linear transfer function and amplifies the strongest frequency component while the other frequency components are suppressed. The frequency divider divides the frequency and averages this as mentioned previously. The signal from the counter triggers the various monostables returning to their respective stable states at different points of time corresponding to different time slots. When the signal from the counter turns low the output signals of the monostables are locked by the latch circuit and the output signals are forwarded to the indicator interpreting the output signals. The indicator indicates by means of light-emitting diodes the frequency range of the strongest frequency component. This solution is cheap and has a simple construction. However, inverters are not particularly suitable as amplifiers since you have poor control of the amplification and noise level.

FIG. 4 shows a second, preferred embodiment of the present invention. Here, the limiter consists of two amplification stages, the first being constructed of an operational amplifier and the second of a comparator coupled as a Schmitt trigger. The comparator is fast operational amplifier with high bandwidth. As is known, a Schmitt trigger has hysteresis in the transfer diagram, i.e., the transition voltage from low to high is higher than the transition voltage from high to low. This results in that the noise lying between the transition voltages is not visible in the output signal from the Schmitt trigger.

The output signals of the limiter are delivered to an OR gate, the output signals of which is delivered to the clock input of a counter, preferably a ripple counter. The outputs of the counter are connected to a decoder interpreting the output signals of the counter. The output signals of the decoder are connected via a latch circuit to an indicator means or a microprocessor. The time slot detector is controlled by a control circuit.

The function of the circuit is as follows. The limiter amplifies the strongest frequency component of the input signal while the weaker components are suppressed. The output signal from the limiter is a square wave having the same frequency as the strongest frequency component. The output signal of the limiter is delivered to an OR gate which also receives a signal COUNT from the control circuit. As long as the signal COUNT is zero the output signal is transmitted to the ripple counter while the output signal constantly is one when COUNT is one. Thus, the counter is stopped after the end of the measurement period and a reading can be done.

In this embodiment the decoder consists of a gate network continuously sensing the outputs of the counter. The counter counts up to a number corresponding to the frequency of the signal from the limiter. The gate network classifies the frequencies in those intervals corresponding to the frequencies of the different types of traffic. When the counter has been stopped and stabilized the output signal of the decoder is locked by the latch circuit. The output signal of the latch circuit is connected to an indicator or a microprocessor controlling some form of indicator. The indicator preferably indicates the different frequency ranges by means of light-emitting diodes. Preferably the indicator is arranged such that the relevant diode flashes in order to enhance the visibility.

The time lapse of one measuring sequence is chosen to 328 ms, which is set by the capacitor and the resistor of the control circuit.

As may be seen from the Figure, the Schmitt trigger consumes the highest current when the output signal thereof is low. Therefore, the circuit is arranged (not shown) such that the signal of the Schmitt trigger goes high when no measurement is performed.

Thus, the decoder if FIG. 4 has fixed frequency ranges in accordance with the configuration of the gate network. Thus, to change frequency ranges the gate network has to be reconstructed.

FIG. 5 shows another embodiment of the device according to the invention. Here, the decoder consists of a programmable memory, e.g., an EEPROM. Instead of a gate network the counter directly addresses a storage location. The data of the storage locations correspond to the desired frequency ranges of the respective type of traffic. The output signals of the memory are transmitted via a latch circuit to an indicator or a microprocessor in the same way as before. By using a bidirectional latch circuit the memory may easily be programmed. The desired output signal is applied to the output/input of the latch circuit as the counter is incremented. In this way the storage locations of the memory are addressed without a need for access to all the pins of the memory circuit. The memory is switched to programming and the direction of the latch circuit is controlled by special pins of the respective circuits. As to the rest, this embodiment operates in the same way as the embodiment of FIG. 4.

The limiter of FIG. 3 can of course also be used together with the time slot detectors of FIGS. 4 and 5. The limiter of FIG. 4 may also be used with the time slot detector of FIG. 3.

Traffic identifiers are often required to be provided with detectors for DC voltage levels. Comparators are known in the art classifying a DC voltage detected in a number of voltage ranges. The output signal of the detector is sent to an indicator via a decoder consisting of a gate network. Hereby the same type of decoder can be used even for the detection of the DC voltage levels.

Traffic identifiers are usually also provided with means for listening to the signal on the paired cable (not shown). This does not form any part of the present invention.

We claim:

1. A device for connection to a communication cable pair carrying an input signal to identify a type of traffic on the communication cable pair, the device comprising:

an isolating means connected to said communication cable pair for isolating from said input signal an isolated signal having a constant amplitude and a frequency corresponding to a strongest component of said input signal;

time slot detector means for detecting the frequency of the isolated signal, said time slot detector means having plural outputs indicative of the detected frequency; and indicator means, connected to plural outputs of the time slot detector means, for indicating the detected frequency of the isolated signal.

2. The device of claim 1, wherein the indicator means comprises:

plural LEDs for visually indicating the detected frequency.

3. The device of claim 1, wherein the isolating means comprises:

a broadband limiter having a limiter input terminal and a limiter output terminal; and a frequency divider connected to and receiving a signal from the limiter output terminal.

4. The device of claim 3, wherein the broadband limiter comprises:

a first resistor having first and second ends, said first end acting as said limiter input terminal;

a second resistor having third and fourth ends, said third end connected to said second end of the first resistor; and a series connection of an odd number of inverters, said series having fifth and sixth ends, said fifth end being the input to the series connection of inverters and said sixth end being the output of the series connection of inverters, said fifth end being connected to said second and third ends, said sixth end being connected to said fourth end, said sixth and fourth ends acting as said limiter output terminal.

5. The device of claim 3, wherein the broadband limiter comprises:

a first amplification stage having a first amp-input and a first amp-output, said first amplification stage comprising an amplifier constructed using an operational amplifier, said first amp-input acting as said limiter input terminal; and a second amplification stage having a second amp-input and a second amp-output, said first amp-output connected to said second amp-input and said second amp-output acting as said limiter output terminal.

6. The device of claim 5, wherein the second amplification stage is a Schmitt trigger.

7. The device of claim 1, wherein the time slot detector means comprises:

plural monostable multivibrators triggered by said isolated signal, each monostable multivibrator having a different time constant and having a monostable output; and a latch for receiving and latching the monostable outputs of the plural monostable multivibrators to generate said plural time slot detector outputs.

8. The device of claim 1, wherein the time slot detector means comprises:

a control circuit for controlling a time period during which pulses from said isolated signal are counted, said control circuit providing a count enable signal, a reset signal and a latching signal;

a ripple counter having an input receiving said reset signal from said control circuit and plural outputs indicating a number of clock pulses since the ripple counter was reset by said reset signal;

an OR gate receiving said count enable signal from said control circuit and said isolated signal from said isolating means, said OR gate having an output connected to the input of the ripple counter;

a decoder for decoding the plural outputs of the ripple counter and converting the plural outputs of the ripple counter to decoded signals indicating the strongest frequency component of said input signal; and a latch for receiving said latching signal from said control circuit, and receiving and latching the decoded signals to generate said plural time slot detector outputs.

9. The device of claim 1, wherein the time slot detector means comprises:

a control circuit for controlling a time period during which pulses from said isolated signal are counted, said control circuit providing a count enable signal, a reset signal and a latching signal;

a counter having an input receiving said reset signal from said control circuit and plural outputs indicating a number of clock pulses since the counter was reset by said reset signal;

an OR gate receiving said count enable signal from said control circuit and said isolated signal from said isolating means, said OR gate having an output connected to the input of the counter;

an EEPROM for receiving and decoding the plural outputs of the counter and converting the plural outputs of the counter to decoded signals indicating the strongest frequency component of said input signal, the EEPROM having plural data input/output lines; and a latch for receiving said latching signal from said control circuit, and receiving and latching the decoded signals to generate said plural time slot detector outputs.

10. The device of claim 9, wherein the latch is:

a bidirectional latch for receiving and latching the decoded signals the EEPROM from said plural data input/output lines of the EEPROM and for providing data to the EEPROM during reprogramming of the EEPROM, the bidirectional latch including a direction input for controlling a direction of data flow through the bidirectional latch.

* * * * *